United States Patent [19]

Neumaier et al.

[11] Patent Number: 4,592,560
[45] Date of Patent: Jun. 3, 1986

[54] REMOVABLE TOOL HOLDER FOR A HAND-HELD DRILLING DEVICE OR THE LIKE

[75] Inventors: Anton Neumaier, Fürstenfeldbruck; Werner Theissig, Munich, both of Fed. Rep. of Germany

[73] Assignee: Hilti Aktiengesellschaft, Furstentum, Liechtenstein

[21] Appl. No.: 591,382

[22] Filed: Mar. 20, 1984

[30] Foreign Application Priority Data

Mar. 22, 1983 [DE] Fed. Rep. of Germany ....... 3310371

[51] Int. Cl.$^4$ ............................................. B23B 31/22
[52] U.S. Cl. ...................................... 279/81; 279/22; 173/93.6
[58] Field of Search .................. 173/163, 93.6; 279/22, 279/81, 83

[56] References Cited

U.S. PATENT DOCUMENTS

| | | | |
|---|---|---|---|
| 2,991,085 | 7/1961 | Lyon | 279/83 X |
| 3,727,432 | 4/1973 | Eaves et al. | 279/15 G |
| 3,762,731 | 10/1973 | Matsumoto | 279/83 X |
| 4,188,041 | 2/1980 | Soderberg | 279/81 X |
| 4,231,581 | 11/1980 | Benedict | 279/19.4 |

FOREIGN PATENT DOCUMENTS 616070 1/1949 United Kingdom .................. 279/22

OTHER PUBLICATIONS

Hilti TE 17 (4 pages).

Primary Examiner—E. R. Kazenske
Assistant Examiner—Willmon Fridie, Jr.
Attorney, Agent, or Firm—Toren, McGeady, Stanger, Goldberg & Kiel

[57] ABSTRACT

A hand-held device for use in drilling or the like includes a tool holder mounted on a rotating spindle. The tool holder is secured to the spindle so that there is no relative rotation between them. The tool holder has a support ring for securing locking elements in locking engagement within recesses in the spindle. A blocking element secures the support ring against rotation so that the locking engagement is maintained. By releasing the blocking element, the support ring can be rotated releasing the locking elements so that the tool holder can be removed from the spindle.

3 Claims, 5 Drawing Figures

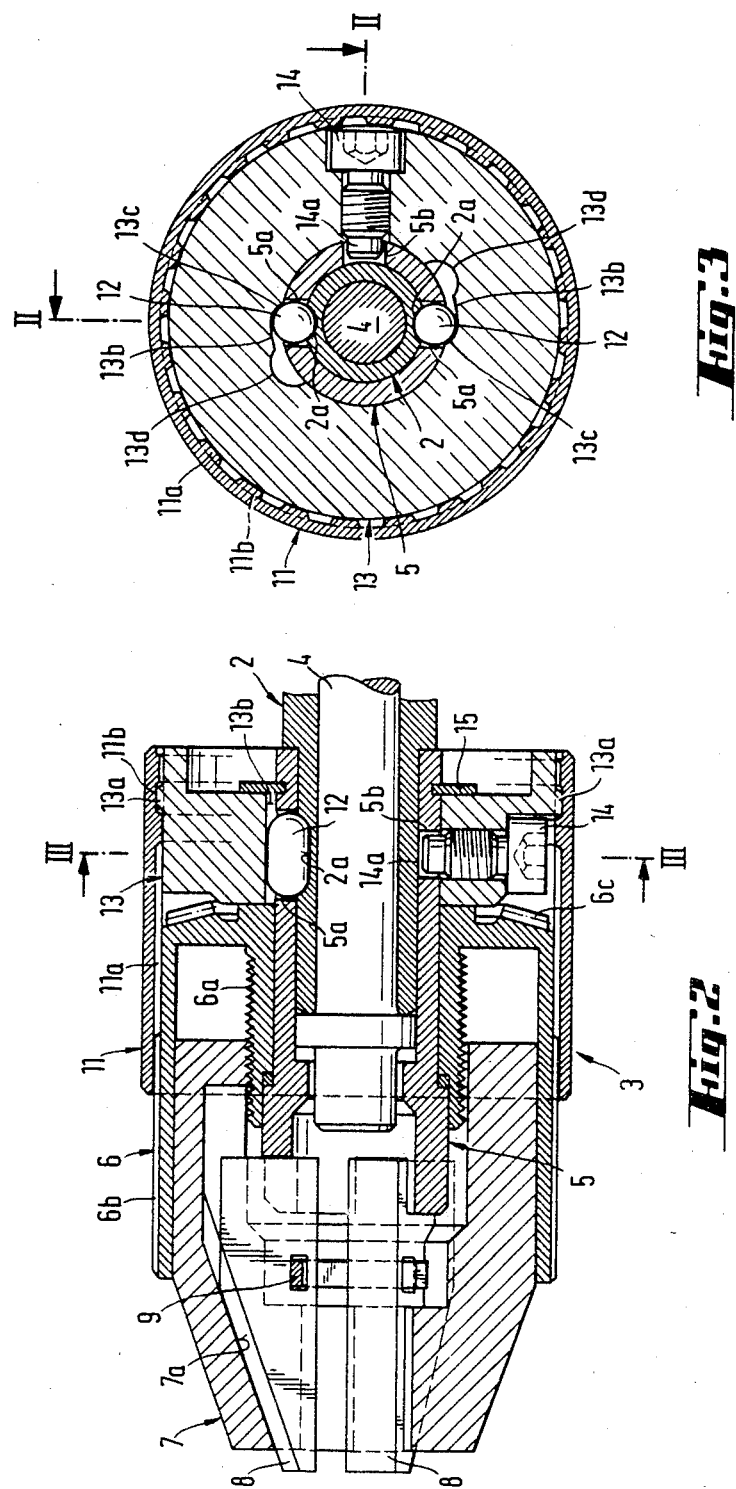

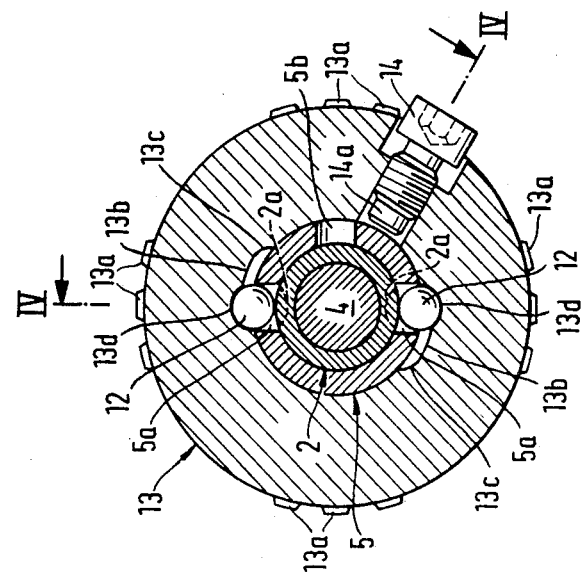
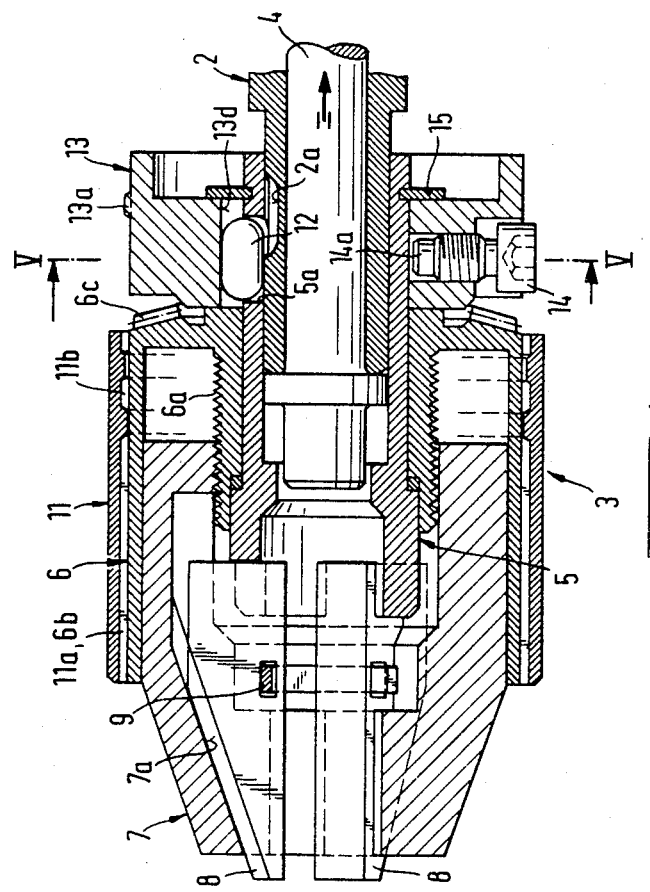

REMOVABLE TOOL HOLDER FOR A HAND-HELD DRILLING DEVICE OR THE LIKE

SUMMARY OF THE INVENTION

The present invention is directed to a hand-held device, such as a drilling device, a hammer drill, a screw driving device or the like, including a tool holder attachable on a rotating spindle, the tool holder includes a carrier sleeve with openings extending through the sleeve for radially displaceable locking elements. A support ring laterally encircles the carrier sleeve and maintains the locking elements positioned within the openings in the carrier sleeve in corresponding recesses in the rotating spindle.

Hand-held devices, such as drilling devices, hammer drills, screw driving devices or the like, as a rule, include a tool holder for receiving drill bits, screwdriver blades and similar tools. Various coupling devices are known for connecting the tool holder with the rotating spindle in the hand-held device.

In one known arrangement, the tool holder is screwed onto the rotating spindle. There are considerable disadvantages in this known coupling type, for instance, excessive tightening of the screw connection, the requirement for auxiliary tools for loosening the screw connection, and limited possibilities of use, since the screw connection permits rotation normally only in one working direction.

In other known hand-held devices, the tool holder is secured on the rotating spindle by roller-like locking elements which extend through openings in a carrier sleeve of the tool holder into recesses in the rotating spindle. When the locking elements are secured within the recesses in the spindle, the tool holder is secured against any rotation or axial displacement relative to the spindle. A support ring enclosing the carrier sleeve holds the locking elements in the engaged position in the spindle.

To remove the tool holder from the rotating spindle, the support ring must be displaced practically for its entire axial length to achieve the disengagement of the locking elements from the spindle recesses. Since the support ring is held between two axially spaced shoulders preventing movement in the axial direction, it is necessary, using auxiliary tools to displace the support ring so that the tool holder can be removed.

In another known tool holder of a similar construction, the support ring is held in the locking position by a spring force. The tool holder can be quickly replaced by displacing the support ring axially against the biasing action of the spring force and thereby permitting the disengagement of the locking elements. Such an arrangement has disadvantages, however, particularly in percussion drilling operations, since the support ring may move into the unlocked position accidentally due to mass inertia of the device. Such axial displacement may occur especially when the spring is worn. Moreover, the axial displacement path of the support ring requires a relatively large structural length of the tool holder and tends to make the hand-held device top-heavy.

Therefore, the primary object of the present invention is to provide a hand-held device of the type mentioned above with a tool holder which can be reliably secured on the rotating spindle and can be quickly replaced without any requirement for special tools. Further, the overall length of the tool holder can be kept small, thereby affording unrestricted use with respect to the working rotational direction.

In accordance with the present invention, a support ring is provided with a blocking or engagement element as well as with recess surfaces in its inner wall permitting the locking elements to be secured either in the locking position or in the release position.

The engagement and disengagement of the locking elements by rotating the support ring affords a reliable and quick acting lock for the tool holder and one which is insensitive to shocks. Axial displacement of the support ring is unnecessary, accordingly, the tool holder can be provided with a short axial length. The blocking element prevents any rotation of the support ring while the rotating spindle is being operated. Further, the blocking action between the support ring and the carrier sleeve provides a connection between the support ring and the rotating spindle preventing relative rotation with the retention of the locking elements in engagement in the recesses in the rotating spindle. Accordingly, the tool holder, which has clamping jaws, can be secured without difficulty onto the rotating spindle of the hand-held device by means of the support ring. To remove the tool holder, the blocking element is released from engagement with the carrier sleeve and the support ring can be rotated relative to the carrier sleeve so that the locking elements are displaced into engagement with surfaces permitting the radial outward movement of the locking elements. When the tool holder is removed from the rotating spindle, the locking elements are automatically held in the recessed surfaces in the support ring.

Preferably, the blocking element is in the form of a locking member supported in the support ring and engageable within an opening in the carrier sleeve. It is also possible, however, in principle, to support the blocking element in the carrier sleeve so that it can engage in an opening in the support ring. The engaged position can be effected by displacement from the outside or by means of a spring force. It is advisable to construct the locking member in the form of a bolt.

In a preferred arrangement of the invention, the locking member can be an adjustable set screw. The adjustable set screw can be moved into and out of the engagement position by rotating the screw and it can be constructed as a standard screw or as a screw with a large knurled head for direct manual actuation. To provide a relatively large displacement path for the adjusting screw with a minimal rotational path of the screw, it is advisable to provide the screw with a coarse thread. Further, it is advantageous if the end of the adjustable screw engageable within the carrier sleeve is shaped complementary to the opening in the sleeve.

In a preferred arrangement, the recessed surfaces in the support ring which engage the locking elements are contoured to provide a shoulder-shaped transition section with the inside surface of the support ring. The transition surface provides a limit for rotational movement of the support ring, whereby the locking elements abut the transition surface when they are properly engaged within the recesses in the rotating spindle. The position of the adjustable screw or blocking element in the support ring is aligned with the opening in the carrier sleeve so that the sleeve opening is located as a projection of the adjustable screw in the locking position of the locking elements. Accordingly, the adjustable screw can be placed in the blocking position with the locking elements in a locking position. Therefore, it is unnecessary to hunt for the locking position.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

FIG. 2 is a cross-sectional view taken along the line II—II in FIG. 3 of the tool holder in the blocked position on a rotating spindle;

FIG. 3 is a transverse sectional view through the tool holder illustrated in FIG. 2 taken along the line III—III;

FIG. 4 is a sectional view similar to FIG. 2, however, showing the tool holder in the unblocked position with the section being taken along the line IV—IV in FIG. 5; and FIG. 5 is a transverse sectional view through the tool holder illustrated in FIG. 4 and taken along the line V—V in FIG. 4.

DETAILED DESCRIPTION OF THE INVENTION

Figure 1:
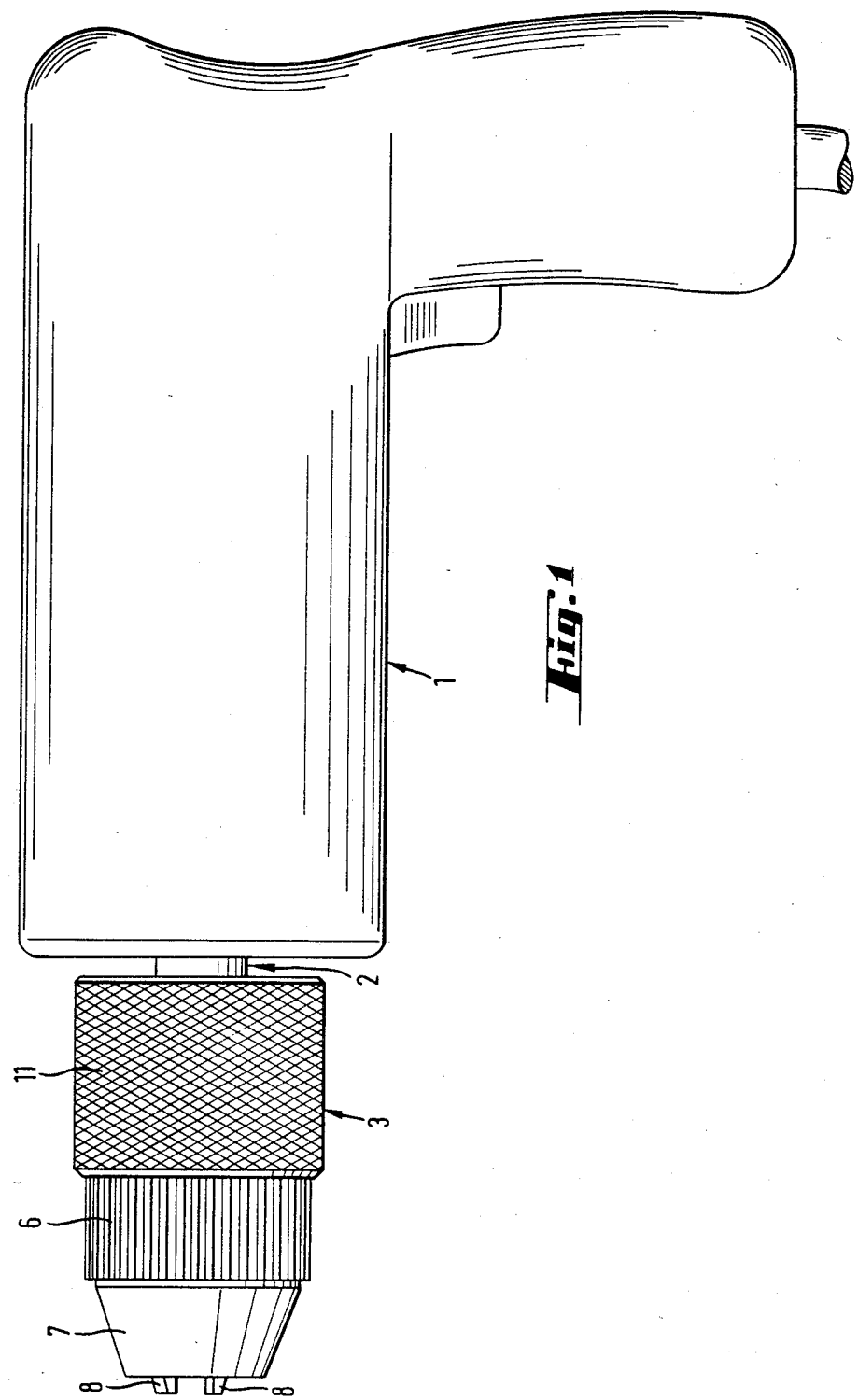
FIG. 1 is a side elevational view of a hammer drill mounting a tool holder.

In FIG. 1, a hammer drill is illustrated including a hand-held housing 1 with a rotating spindle 2 projecting out of the front end of the housing and with a tool holder 3, in the form of a chuck, mounted on the rotating spindle.

In FIG. 2, the tool holder 3 is shown separate from the housing 1, however, the rotating spindle 2, which is mounted in the housing, is shown extending into the tool holder. A percussion anvil 4 or piston extends axially through the spindle 2 and is axially displaceable relative to the spindle.

The tool holder 3 is made up of the following parts: a carrier sleeve 5, an adjusting sleeve 6, a partly frusto-conically shaped bracing sleeve 7, clamping jaws 8, an annular spring 9, a locking sleeve 11, locking elements 12, a support ring 13, a blocking element or adjustable screw 14, and a securing disc 15.

Clamping jaws 8 are reliably displaceably mounted in the front end of the carrier sleeve 5. The radially outer edges of the clamping jaws bear against the radially inner surface 7a of the frusto-conical part of the bracing sleeve 7 so that the jaws can be moved radially inwardly or outwardly due to the contact with the surface 7a. Due to the arrangement of the clamping jaws in the carrier sleeve 5 and in engagement with the bracing sleeve 7, they are held against any rotation and axial displacement relative to the carrier sleeve and the bracing sleeve and they are radially displaceable based on the axial position of the bracing sleeve 7 relative to the adjusting sleeve 6. Annular spring 9 extends through openings in the clamping jaws 8 and biases the jaws radially outwardly into contact with the guide surface 7a on the inside of the bracing sleeve 7. By axially displacing the bracing sleeve 7, the radial position of the clamping jaws can be adjusted for locking or releasing a tool to be held in the tool holder. Axial displacement of the bracing sleeve 7 is effected by rotating the adjusting sleeve 6 relative to the carrier sleeve 5. Note that while the adjusting sleeve can be rotated about the carrier sleeve 5, it cannot be displaced axially relative to the carrier sleeve. Since the bracing sleeve 7 is in threaded engagement at its rear end with the outer thread 6a on the adjusting sleeve, the rotation of the adjusting sleeve effects the axial displacement of the bracing sleeve and, in turn, the radial adjustment of the clamping jaws 8.

In the position of the tool holder shown in FIG. 2, secured onto the rotating spindle 2, it is not possible to rotate the adjusting sleeve 6 relative to the carrier sleeve 5 since inside teeth 11a on the locking sleeve 11, laterally encircling the adjusting sleeve 6, engage in teeth 6b on the outside surface of the adjusting sleeve. Further, teeth 11b on the inside surface of the locking sleeve are located between two annular cams, one ahead of and one behind the teeth, and mesh with teeth 13a on the radially outer surface of the support ring 13, held by the adjustable bolt 14 so that it cannot rotate relative to the carrier sleeve. The teeth 13a provide a detachable catch for the locking sleeve 11 in cooperation with the inwardly directed cams on the locking sleeve.

Locking elements 12 are supported in windows or openings 5a extending from the inside to the outside surfaces of the carrier sleeve 5. Radially outwardly, the locking elements are engaged by the support ring 13, note FIG. 3, and engage within complementary shaped recesses 2a in the surface of the rotating spindle 2. The support ring 13 has a shaped recess formed by a first surface 13b which holds the locking element 12 in the recesses 2a. At one end of each recess, the first surface 13b extends into the inside surface of the support ring via a transition surface 13c which forms a shoulder-like radial taper, note FIG. 3.

On the opposite end of the first surface 13b from the transition surface 13c, a second surface 13d is formed extending deeper into the support ring from its inside surface. The second surface 13d extends from the first surface 13b and curves first radially outwardly and then radially inwardly until it reaches the inside surface of the support ring 13. The extra depth afforded by the second surface 13d permits the locking element, when it is aligned with the second surface, to move radially outwardly. Adjustable bolt 14 is positioned in the support ring 13 so that it can be rotated and displaced radially relative to the carrier sleeve 5. The radially inner end of the bolt 14 has a projection 14a which can be engaged within an opening 5b in the carrier sleeve 5. With the projection 14a located within the opening 5b the adjustable bolt 14 secures the support ring 13 against rotation relative to the carrier sleeve and positions the first surfaces 13b relative to the locking elements 12 so that the locking elements are held radially inwardly within the recesses 2a in the rotating spindle. In this arrangement, the locking elements are reliably secure within the recesses 2a.

A working tool, such as a drill bit, not shown, can be clamped in the tool holder 3 by rotating the adjusting sleeve 6 relative to the carrier sleeve 5. For rotation of the adjusting sleeve 6, the locking sleeve 11 must be pushed forwardly so that it is disengaged from the support ring 13, as shown in FIG. 4. In the axial movement of the locking sleeve, one of the cams on the inside surface of the locking sleeves must be displaced over the teeth 13a on the outside surface of the support ring. The adjusting sleeve 6 can be rotated manually by means of the locking sleeve 11. The locking sleeve 11 is in meshed engagement with the adjusting sleeve 6 by means of its teeth 11a and in engagement with the teeth 6b on the adjusting sleeve. It is possible to apply a greater torque or turning moment to the adjusting sleeve by the use of a beveled ring gear key which can be supported, in a known manner, in the support ring 13 so that it is in meshed engagement with the beveled teeth 6c formed on the rear end of the adjusting sleeve 6. The counter-torque transmitted to the support ring 13 during the adjusting process by means of the beveled ring gear key, not shown, is transmitted via the blocking adjustable bolt 14 to the carrier sleeve 5 and from the sleeve, via the locking elements 12, to the rotating spindle 2. Accordingly, the adjustable bolt 14 has a function in the force transmission chain from the beveled ring gear key to the rotating spindle 2, which function is important for securely tightening the clamping jaws 8.

To remove the tool holder 3, the locking sleeve 11 must be moved into its forward position as shown in FIG. 4. In this forward position, access is available to the adjustable bolt 14. By backing the projection 14a on the adjustable bolt 14 out of engagement with the opening 5b, the support ring can be rotated relative to the carrier sleeve 5. When the support ring 13 is rotated, the first surface 13b within the recess in the support ring is moved out of engagement with the locking elements 12 and the locking elements move into surface engagement with the surfaces 13d, note FIGS. 4 and 5. Since the locking elements 12 are no longer held within the recesses 2a in the rotating spindle 2, the tool holder 3 can be moved from the spindle by relative movement of the tool holder and the spindle causing the locking elements 12 to seat against the second surfaces 13d. Accordingly, a rapid exchange of tool holders with different clamping devices is possible.

While a specific embodiment of the invention has been shown and described in detail to illustrate the application of the inventive principles, it will be understood that the invention may be embodied otherwise without departing from such principles.

What is claimed is:

1. A hand-held device, such as a drilling device, a hammer drill, or a screw driving device, comprising an axially extending rotating spindle having first recesses formed in the outside surface thereof, an axially extending tool holder mounted on one of said rotating spindle, said tool holder comprising an axially extending carrier sleeve encircling said rotating spindle, a support ring and locking elements so that said tool holder can be removably secured on said spindle, said carrier sleeve having an inner surface and an outer surface with first openings extending radially from the inner surface to the outer surface thereof, said tool holder including means for securing a tool therein, said locking elements positioned within and being radially displaceable through said first openings, said locking elements being spaced axially in said tool holder from said means for securing a tool, said support ring encircling said carrier sleeve in the axially extending range of said first openings in said carrier sleeve and being rotatable relative to said carrier sleeve, said support ring disposed in surface contact with said locking elements for selectively securing said locking elements in said first recesses in said rotating spindle, a blocking element mounted in said support ring, said support ring having an inside surface facing said carrier sleeve and a second recess in said inside surface for each said locking element, each said second recess in the circumferential direction of said support ring having a first surface spaced outwardly from the inside surface of said support ring, a second surface extending circumferentially from said first surface and spaced further from the inside surface of said support ring than said first surface and a third surface at the end of said first surface spaced circumferentially from said second surface and forming a transition section extending radially inwardly from said first surface to the inner surface of said support ring whereby said third surface provides a limit for rotational movement of said support ring relative to said carrier sleeve, said blocking element being selectively positionable for securing said support ring so that is it held not rotatable relative to said carrier sleeve, said first surfaces of said second recesses being in contact with said locking elements when said blocking element provides rotation of said support ring relative to said carrier sleeve, and said second surfaces of said second recesses being engageable with said locking elements when said blocking element permits rotation of said support ring relative to said carrier sleeve so that said locking elements move radially outwardly through said first openings in said carrier sleeve out of engagement with said first recesses in said rotating spindle and into engagement with said second surfaces in said second recesses.

2. A hand-held device, as set forth in claim 1, wherein said blocking element is a locking member radially movable supported in said support ring carrier sleeve having an opening therein arranged to receive said locking member.

3. A hand-held device, as set forth in claim 2, wherein said locking member is an adjustable screw in threaded engagement with said support ring so that said screw can be displaced into the opening in said carrier sleeve for securing said support ring against rotation relative to said carrier sleeve.

* * * * *